Oct. 23, 1951 — L. BREWTON — 2,572,306
TRACTION SUPPLY DEVICE
Filed Oct. 30, 1947
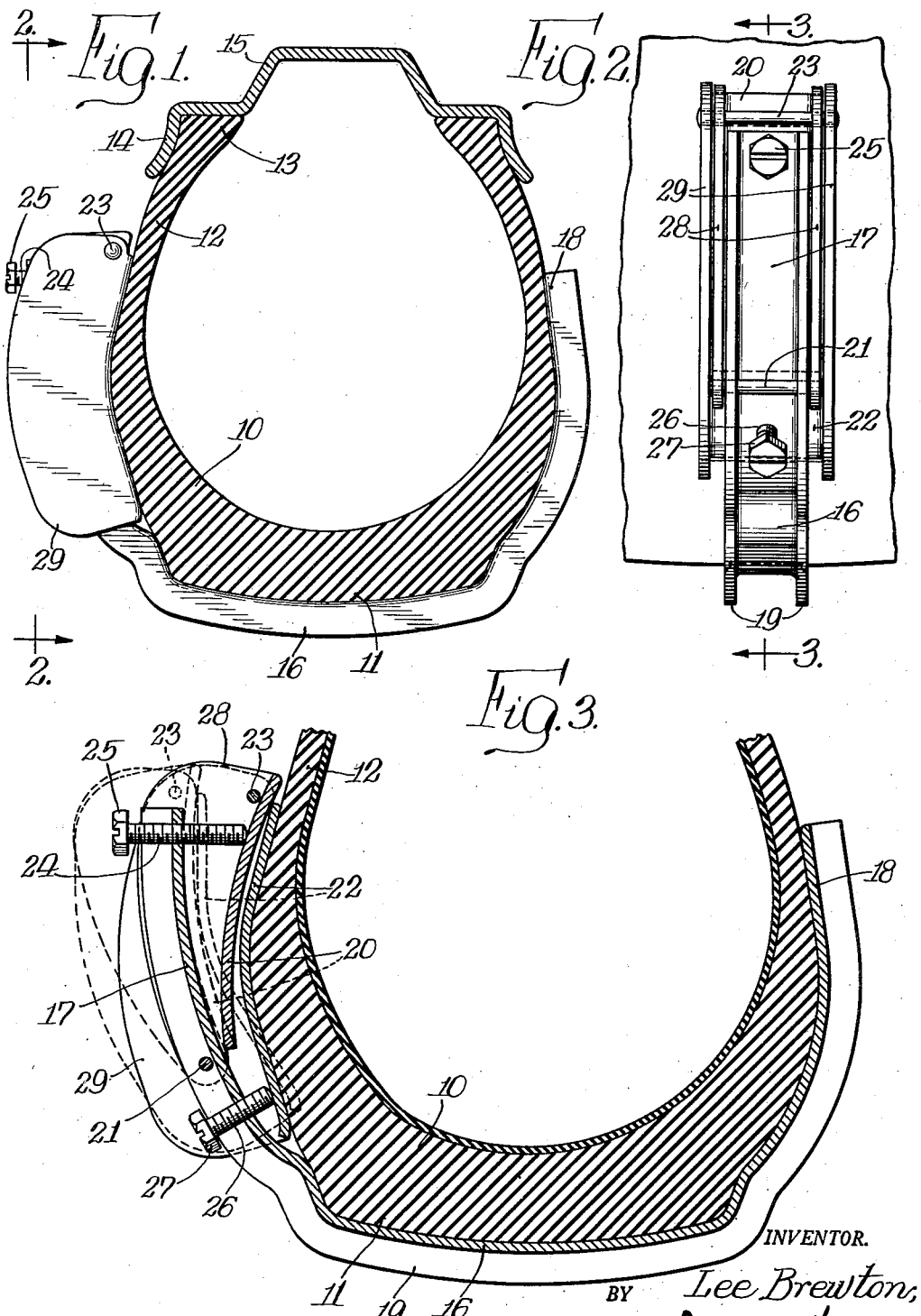
INVENTOR.
Lee Brewton,
BY Stanley Howe
Atty.

Patented Oct. 23, 1951

2,572,306

UNITED STATES PATENT OFFICE 2,572,306

TRACTION SUPPLY DEVICE

Lee Brewton, Melrose Park, Ill., assignor to Federated Machine Products Inc., Chicago, Ill., a corporation of Illinois Application October 30, 1947, Serial No. 783,005

5 Claims. (Cl. 152—225)

This invention relates to a traction supply device for wheels of motor driven vehicles, the primary purpose and object being to facilitate the attachment thereof to the wheel of the vehicle and its detachment therefrom, and for securing the same thereto in a rigid manner.

Still further objects of this invention consist in providing a traction supply device of this character that is easy to handle, comprised of few parts and one that may be used over a long period with practical freedom from mechanical annoyance.

With these and incidental objects in view, the invention consists in certain novel features of construction and combination of parts, the essential elements of which are set forth in the appended claims, and a preferred embodiment of which is hereinafter shown with reference to the drawing accompanying and forming a part of this specification.

Fig. 1 is an end view showing a preferred embodiment of the present invention as it appears in operative relation to the tire of a vehicle wheel.

Fig. 2 is a side view thereof looking in the direction of the arrows 2 in Fig. 1.

Fig. 3 is a fragmentary enlarged view in vertical section taken on line 3—3 of Fig. 2.

Reference being had more particularly to the drawings, the numeral 10 designates generally a vehicle tire of conventional construction and design having a tread portion 11 thereon and side walls 12, each terminating in a bead 13 seated or confined between flanges 14 of a suitable tire rim.

A traction supply device in accordance with this invention as disclosed in the drawings comprises a U-shaped metal frame wherein the central or transverse portion 16 is adapted to closely engage the external surface of the tire tread portion 11, and a pair of side members or arms 17 and 18 at opposite ends of said central portion 16 which are adapted to straddle the side walls 12 of the tire 10 when the tread portion of the latter is engaged by the inner surface of the central portion 16. The frame, as shown, is of channel-shape construction with the channel opening in the direction of the outer surface of the frame, thus providing radial webs 19 at opposite longitudinal edges of the frame.

The distance between the arms 17 and 18 is relatively greater than the axial cross-sectional dimension of the tire 10 to which the frame is to be operatively applied so as to provide clearance between the side walls of the tire and the inner surface of the arms 17 and 18.

For the purpose of making the arms 17 and 18 fast to the tire 10, the present invention in its preferred embodiment, contemplates use of a pressure applying means arranged on one of the arms of the frame for operation between said arm and side wall of the tire opposite thereto. Such means includes a link or lever 20 disposed inwardly of the arm 17 for swinging movement longitudinally of the frame about a shaft 21 having bearing support in the web portion 19 substantially midway of the length of the arm 17. A pressure plate 22 disposed inwardly of the lever 20 is hinged as at 23 to the outer swinging end of the lever 20 whereby the plate 22 is movable independently of the lever 20 about an axis parallel to the axis of movement of the lever 20. The outwardly facing wall of the lever 20 is acted upon by a screw 24 having threaded connection with the arm 17, and having an operating head 25 protruding from the outer surface of the arm 17, by which the lever 20 is swingable toward and away from the arm 17. Such swinging movement of the lever 20 accordingly acts on the outer surface of the pressure plate 22 to move the latter in unison with the lever. A portion of the pressure plate 22 extending clear of the path of movement of the lever 20 presents an outer surface engaged by a screw 26 mounted in the arm 17 whereby adjustment of the screw 26 by means of an operating head 27 affords movement of the plate 22 independently of the lever 20.

Accordingly, operation of the head 25 to advance the screw from a retracted position causes the lever 20 and plate 22 to swing about the pivot 21 in a clockwise direction as viewed in Fig. 3, while adjustment of the screw 26 from a retracted position moves the plate about the pivot 23 in a counterclockwise direction. This arrangement serves to insure a uniform distribution of pressure against the side wall of the tire 10 throughout an area coextensive with the area of the face of the plate 22, with the result that the frame is more securely held fast to the tire 10.

It will be noted that flanges 29 extending along the longitudinal edges of the pressure plate 22 overlap similar flanges 28 on the edges of the lever 20, which in turn overlap the webs 19 on the arms 17 and 18 of the frame. This relationship of the flanges and the webs provides an interlocking of the frame, lever and pressure plate designed to furnish added resistance to separation of the parts under force of rotation of the tire 10 when operatively gripped by the traction supply device.

What is claimed is:

1. A traction supply device for attachment to a vehicle tire comprising a U-shaped frame providing arms for straddling the opposite side wall portions of a tire and a connecting portion between the inner ends of said arms having an inwardly facing surface engageable with the tread portion of the tire between said side wall portions, means for fastening the frame to the tire including a pressure member mounted for swinging movement longitudinally of said frame between said arms, said pressure member being provided with radially outwardly extending webs at opposite longitudinal edges thereof adapted to overlap the opposite longitudinal edge portions of the frame.

2. In a traction supply device in accordance with claim 1 wherein an adjusting screw mounted in one of said arms bears against the swinging end of the pressure member to advance the latter toward the tire.

3. A traction supply device for attachment to a vehicle tire comprising a U-shaped frame providing arms of substantially uniform length for straddling the opposite side wall portions of a tire and a connecting portion between the inner ends of said arms having an inwardly facing surface engageable with the tread portion of the tire between said side wall portions, means for fastening the frame to the tire including a lever supported inwardly of one of said arms for swinging movement between said latter arm and the side wall portion of the tire opposite thereto and a pressure plate supported on said lever for relative swinging movement between said lever and the side wall portion of the tire opposite thereto.

4. In a traction supply device in accordance with claim 3 wherein swinging movement of the lever is regulated by an adjusting screw penetrating the arm of the frame on which it has relative swinging support and swinging movement of the pressure member relative to the lever is regulated by an adjusting screw penetrating the arm of the frame on which the lever has relative swinging support but clear of the path of movement of said lever.

5. In a traction supply device in accordance with claim 3 wherein flanges extend radially outwardly from the opposite longitudinal edges of said lever and said pressure plate cooperates with the longitudinal edges of the arm of the frame to resist separation of parts under force of rotation of the tire when the frame is operatively fastened thereto.

LEE BREWTON.

REFERENCES CITED

The following references are of record in the file of this patent:

UNITED STATES PATENTS

| Number | Name | Date |
|---|---|---|
| 1,800,878 | Vosburgh | Apr. 14, 1931 |
| 1,946,846 | Gebhart | Feb. 13, 1934 |
| 2,119,447 | Stahl et al. | May 31, 1938 |
| 2,330,839 | O'Brien | Oct. 5, 1943 |
| 2,447,357 | Mosley | Aug. 17, 1948 |